(12) United States Patent
Hoffmann

(10) Patent No.: US 6,813,035 B2
(45) Date of Patent: Nov. 2, 2004

(54) METHOD FOR DETERMINING THREE-DIMENSIONAL SURFACE COORDINATES

(75) Inventor: Christian Hoffmann, Munich (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/169,149

(22) PCT Filed: Dec. 12, 2000

(86) PCT No.: PCT/DE00/04417
§ 371 (c)(1),
(2), (4) Date: Jun. 27, 2002

(87) PCT Pub. No.: WO01/48438
PCT Pub. Date: Jul. 5, 2001

(65) Prior Publication Data
US 2003/0002052 A1 Jan. 2, 2003

(30) Foreign Application Priority Data
Dec. 27, 1999 (DE) .......................... 199 63 333

(51) Int. Cl.⁷ ............................................ G01B 11/24
(52) U.S. Cl. ........................... 356/603; 35/601; 35/602; 35/610
(58) Field of Search ................................ 356/600–614, 356/618–623, 2, 3.04, 3.06, 3.09, 3.01, 3.1, 4.01; 250/558, 559.22, 559.23; 348/42, 47; 382/145, 154

(56) References Cited

U.S. PATENT DOCUMENTS

| | | | |
|---|---|---|---|
| 4,443,706 A | * 4/1984 | DiMatteo et al. | ............ 250/558 |
| 4,525,858 A | * 6/1985 | Cline et al. | .................. 382/154 |
| 4,668,094 A | 5/1987 | Matsumoto et al. | |
| 4,825,263 A | * 4/1989 | Desjardins et al. | .......... 356/603 |
| 4,846,577 A | * 7/1989 | Grindon | ...................... 356/610 |
| 4,948,258 A | 8/1990 | Caimi | |
| 5,638,190 A | * 6/1997 | Geist | ........................... 358/500 |
| 6,028,672 A | * 2/2000 | Geng | ........................... 356/602 |
| 6,341,016 B1 | * 1/2002 | Malione | ...................... 356/603 |

OTHER PUBLICATIONS

K.L. Boyer et al., "Color–Encoded Structured Light for Rapid Active Ranging", IEEE PAMI 9 (1) 1987.
H. Hugli et al., "Generation and Use of Color Pseudo Random Sequences for Coding Structured Light in Active Ranging", SPIE vol. 1010 Industrial Inspection, 1988.
X. Jiang et al., "Dreidimensionales Computersehen", Springer Verlag, 1997.
P.M. Griffin et al., "Generation of Uniquely Encoded Light Patterns For Range Data Acquisition", Pattern Recognition, US, Pergamon Press Inc. Elmsford, N.Y., vol. 25, No. 6, Jun. 1, 1992, pp 609–616.
R.A. Morano et al., "Short Papers Structured Light Using Pseudorandom Codes", IEEE Transactions on Pattern Analysis and Machine Intelligence. US, IEEE Inc. New York, vol. 20, No. 3, March 1, 1998, pp 322–327.
J. Salvi et al., "A Robust–Coded Pattern Projection for Dynamic 3d Scene Measurement", Pattern Recogniton Letters, North–Holland Publ. Amsterda, NL, vol. 19. No. 11, Sep. 1, 1998, pp 1055–1065.
J. Battle et al., "Recent Progress in Coded Structured Light as a Technique to Solve the Correspondence Problem— Image Segmentation Techniques", Pattern Recognition. US, Pergamon Press Inc. Elmsford, N.Y., vol. 31, No. 7, Jul. 31, 1998, pp 963–982.

* cited by examiner

Primary Examiner—Frank G. Font
Assistant Examiner—Sang H. Nguyen
(74) Attorney, Agent, or Firm—Young & Thompson

(57) ABSTRACT

The formation of a two-dimensional color pattern (9) consisting of colored pattern elements (10) enables a particularly compact and faultproof color pattern for a coding to be provided. The aim of the invention is to determine the projection angle PHI for a pattern element in the picture record of the two-dimensional color pattern projected onto an object. Three dimensional data of an object point can be calculated by subsequent triangulation at a known position of the projector and a camera.

14 Claims, 3 Drawing Sheets

FIG 1 pattern sequence S1

0362751424150253713046173163572605206474 pattern sequence S2

1473062535261364024157204274603716317505250417364637247513526031530571402742061 6

0362751424150253713046173163572605206474
1473062535261364024157204274603716317505250417364637247513526031530571402742061 6
0362751424150253713046173163572605206474
1473062535261364024157204274603716317505250417364637247513526031530571402742061 6
0362751424150253713046173163572605206474
1473062535261364024157204274603716317505250417364637247513526031530571402742061 6
0362751424150253713046173163572605206474
1473062535261364024157204274603716317505250417364637247513526031530571402742061 6

0 = black, 1 = green, 2 = yellow, 3 = red, 4 = purple, 5 = white, 6 = blue-green, 7 = dark blue

METHOD FOR DETERMINING THREE-DIMENSIONAL SURFACE COORDINATES

CROSS REFERENCE TO RELATED APPLICATIONS

This application is the 35 USC 371 national stage of international application PCT/DE00/04417 filed on Dec. 12, 2000, which designated the United States of America.

FIELD OF THE INVENTION

The invention relates to a three-dimensional optical measurement of the surface of objects. This plays a special part in construction, for example in reproduction, and a major part in production control, in particular for quality monitoring, in re-engineering, such as repairs, expansions of existing machines and installations. It is also increasingly being employed in the case of non-technical objects, such as, for example, in the quality control of foodstuffs or in the identification and authentication of persons. Further areas of use are three-dimensional modeling of objects for virtual reality and the multimedia and games sectors.

BACKGROUND OF THE INVENTION

For many years, the principle of the "coded light approach" (CLA) has been used for the three-dimensional measurement of objects. In this case, a projector successively illuminates an object with different light patterns, with structured light. A camera records images of the object thus illuminated. Projector, camera and object point form a triangle in this case. Triangulation is used to calculate the point coordinates on the object surface. A prerequisite for this is that the spatial positions of projector and camera in a fixed coordinate system are known beforehand. Moreover, an angle Φ at which the projector illuminates the object point (FIG. 2) must be known for each point of the object image. The initially known position data are obtained by a calibration operation, and the camera angle κ of the viewing beam of the camera, which angle is associated with an object point, is known through the pixel coordinates and through the data from the optical camera calibration. The "coded light approach" achieves the determination of the angle Φ as follows: a series of strip-type light patterns with varying strip width are successively projected onto the stationary object and respective images thereof are recorded, and the bright and dark pixels of the object thus illuminated, separately for each pixel, are combined to form a coding, so that the projection angle Φ can be inferred from the coding.

Since, in this method, each object point must maintain its position during all the image recordings with the different projected patterns, this method is well suited to static, unmoving objects, but is not suited to moving or deforming objects. Accordingly, use is not recommended, in the case of identification of persons, for faces or other body parts or in the case of moving objects on a transport device. Various proposals have been made for improving the method.

The literature reference [1] proposes that only a single pattern is projected and this pattern is composed of groups of colored vertical strips which comprise subgroups which are unique in the entire pattern and can thus be identified in the image of a color camera. If these subgroups are not disturbed or damaged, the projector light plane can be determined from them for each color strip and the triangulation can be carried out. The longer the subgroups, however, the greater the likelihood of disturbances which arise for example as a result of depth jumps or occlusions on the object. This leads to non-identified or incorrectly identified groups and thus to errors in the three-dimensional coordinate determination.

In the literature reference [2], it was found during investigations with groups of length 6 with four colors during simulated disturbances of the patterns that up to 20% of all the strips could not be determined and up to approximately 8% were decided incorrectly. Therefore, this method of determining the strip number from horizontal groups of vertical color strips must be rated as unsatisfactory.

Generally, it can be stated that, in order to determine the projection angle of a surface point of an object, the surroundings thereof must be considered if only a single pattern is intended to be projected. The larger the surroundings of a pixel which are necessary for determining (decoding) the projection angle, the greater the risk of damage to the coding as a result of depth jumps or occlusions.

An overview of known methods for three-dimensional measurement is afforded by the literature reference [3].

SUMMARY OF THE INVENTION

The invention is based on the object of providing a reliable light coding for the three-dimensional determination of surface coordinates of an object when using only a single projected pattern, whereby corruptions due to erroneous evaluation of the coding or due to a movement of the object are eliminated.

The invention is based on the fact that two-dimensional color patterns can be composed of individual pattern elements which can differ in terms of color or in terms of their spectral composition in a predetermined manner and in which it is possible to unambiguously reconstruct the projection angle Φ in the recorded image of the object illuminated with the color pattern and assign it to each pattern element. This is done as follows: the color or the spectral composition of a selected pattern element is measured and this color or spectral composition is compared with one of the adjacent pattern elements in a row, which is oriented approximately horizontally, for example, and with one of the adjacent pattern elements situated in an adjacent row. In this case, then, the coding for a pattern element comprises the color of the pattern element itself and the color or spectral difference with respect to one of its neighbors in a preferably horizontal direction and one of its neighbors in a direction which lies approximately perpendicularly thereto. As a result, the local surroundings necessary for the coding are restricted to a minimum, namely to two of the immediate neighbors. The coding is designed in such a way that, in a color pattern, the combination of one pattern element presently under consideration with one of its immediately adjacent elements in the row and with one of its immediately adjacent elements from an adjacent row in the direction of the row is unique.

The geometrical form of the pattern elements may be arbitrary, for example polygonal (triangle, quadrangle, hexagon . . . ) or else circular. The directions of the preferably horizontal adjacency within a row and of the preferably vertical adjacency in the direction of an adjacent row need not be perpendicular to one another, but can differ by 90°. It is advantageous for a color pattern to be composed of pattern elements which represent elongate rectangles. In particular, short, vertically upright strips are used which differ systematically in terms of their colors or in terms of their spectral composition in the horizontal and vertical directions. If e.g. eight different colors are used, for example additively composed of the three primary colors red, green, blue, which are designated by the numbers 0, 1, 2, . . . 7, then one part of the color pattern can comprise the horizontal arrangement of eight vertical strip sections with the colors 0, 1, 2, 3, 4, 5, 6, 7, and another part of the color pattern can comprise the arrangement 0, 7, 6, 5, 4, 3, 2, 1. These two parts can be differentiated solely by a comparison with one of the horizontal neighbors, because the difference in the color numbers is ascending in the case of the first group and descending in the case of the second group (modulo 8!). Arranged one beside the other, e.g. the color sequence of length 16 is produced: "0, 1, 2, 3, 4, 5, 6, 7, 0, 7, 6, 5, 4, 3, 2, 1". This can be repeated periodically a number of times one beside the other, that is to say in a row. In order to be able to differentiate the different periods of the entire color pattern from one another, there is arranged above and below this strip sequence, i.e. in adjacent rows, another strip sequence whose color numbers can be differentiated in the vertical direction by different differences in the color numbers.

In order to adapt the number of pattern elements or the size thereof to the surface structure and to the required accuracy of the resolution, the color pattern is constructed with correspondingly long rows with repeated sequences and from a multiplicity of at least two differently formed adjacent rows. From the two-dimensional color pattern, the horizontal position of a surface point within the sequence and thus the projection angle $\Phi$ can be determined in the recorded camera image within the sequences, that is to say within a row. The horizontal position of a pattern element can thus be converted directly to the projection angle $\Phi$. Overall, each color can be unambiguously classified and can be distinguished from every other color.

An advantageous refinement of the invention provides for a separating strip having a color or spectral composition that differs from all the pattern colors to be positioned between two rows. The color identity of two directly adjacent pattern elements in adjacent rows is permitted in this variant.

BRIEF DESCRIPTION OF THE DRAWINGS

Exemplary embodiments are described below with reference to diagrammatic figures.

FIG. 1 shows pattern sequences S1 and S2 and also a color pattern constructed therefrom.

DETAILED DESCRIPTION OF THE INVENTION

Figure 2:
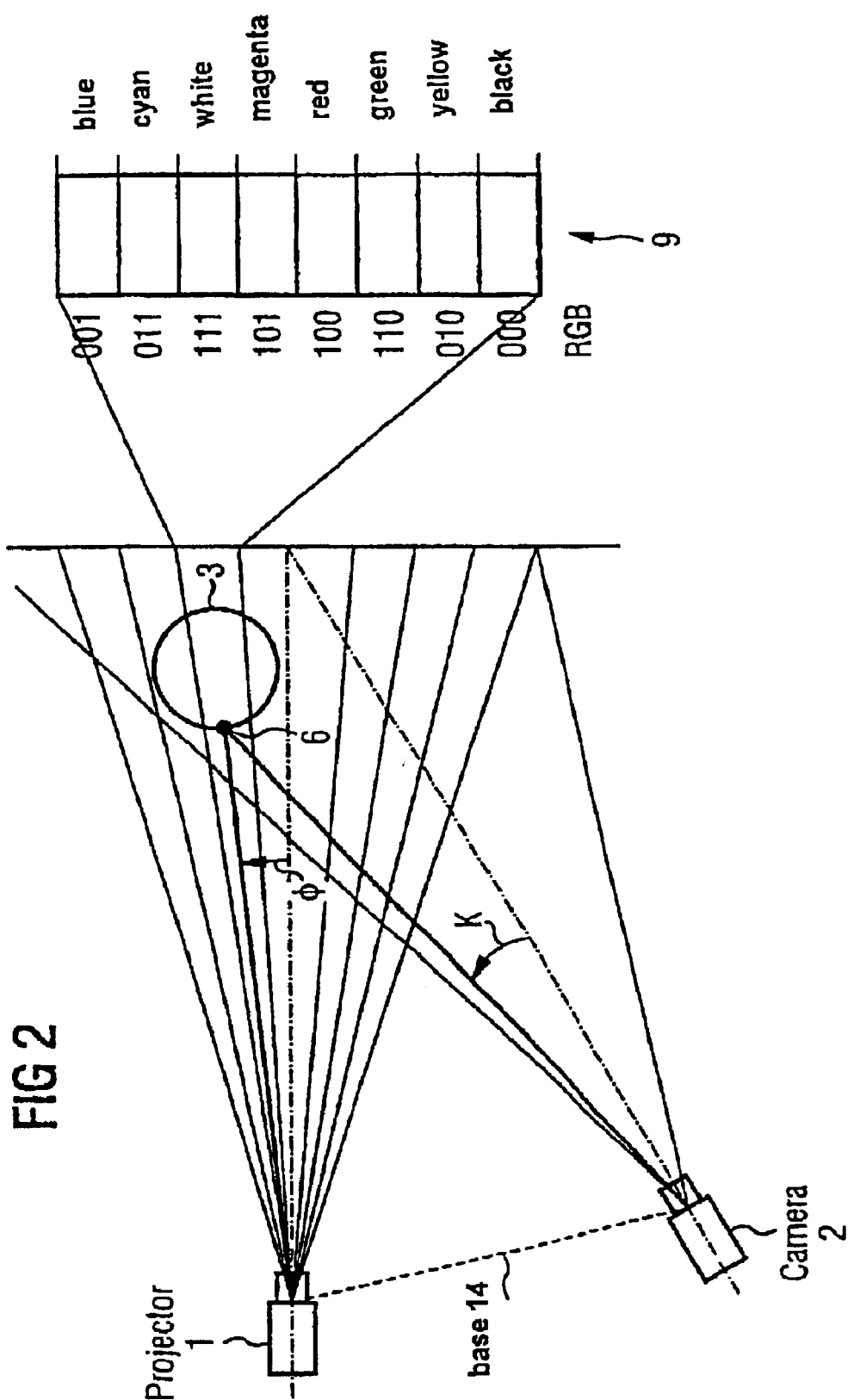
FIG. 2 shows a diagram for the calculation of three-dimensional coordinates at an object surface with a color pattern projection.

Two pattern sequences S1 and S2 are illustrated in the upper part of FIG. 1. The sequence S1 in this case comprises two identical halves 7, 8. The sequence S2 comprises two nonidentical parts 71, 81. The numbers in each case correspond to a color present in the color pattern, as is illustrated in the lower part of FIG. 1. In the color pattern 9. illustrated in the central part of FIG. 1, the pattern sequences S1 and S2 are strung one below the other, as double row, a total of four times. In this pattern sequence, the horizontal difference between two adjacent pattern elements 10 is greater than 1. The vertical difference is either 1 or −7 for the first half (7, 71), which is equivalent in the case of 8 different colors. The subsequences 7, 8 of the pattern sequence S1 which are illustrated in FIG. 1 contain all variations, i.e. subsets taking account of the order, of two out of eight numerals with horizontal differences which are ≠1. The numbers increased by 1, 2 or 3 (modulo 8) in the vertical difference also have the aforementioned properties, so that the pattern sequence S2 is suitable as adjacent row with respect to the sequence S1 in order that the comparison of a pattern element with immediately adjacent pattern elements from adjacent rows yields a color difference with the aid of which the first half 7, 71 of the sequences S1 and S2 can be differentiated from the second half 8, 81, so that, despite the repetition of the subsequence 7, 8, each pattern element can be unambiguously localized by comparison of the elements in the adjacent row in the total sequence in the row direction. The color pattern 9 can be extended by further sequences in the row direction which have other vertical color number differences, e.g. 0, 3 and 4. Since different colors in each case adjoin one another in a color pattern 9 and form boundary regions or boundary zones, what is important is to detect the color differences. If instead of the vertical difference of 1 or −7, for example, the vertical difference is intended to be =0, i.e. the color identity between vertically adjacent pattern elements 10 is permitted, then horizontal separating strips 13 must advantageously be inserted between the rows 4. These separating strips have a color that differs from all the colors of the pattern element 10. The color of the separating strips may preferably be black. In this case, by way of example, if the vertical difference between adjacent pattern elements is =0, it is possible to perform the differentiation between the pattern elements of adjacent rows, since black separating strips 13, for example, represent the boundaries between pattern elements in the vertical direction. The colors of the pattern elements may include ultraviolet or infrared light.

In order to decode the absolute position of a pattern element 10 within a sequence in the camera image, it is necessary firstly to determine its color. The aim is to determine the projection angle $\Phi$. In order to find its neighbors in the image, it is necessary to determine the contours of the pattern element that is projected on the object 3 and imaged by the camera optical arrangement. In the image, said pattern element is generally not rectangular and not oriented exactly as in the projected pattern. The contours to be detected are the boundaries with respect to the adjacent pattern elements 10. Through a preceding calibration of projector 1 and camera 2 and through the preferably horizontal orientation of the rows in the projection pattern, it is possible to reconstruct the orientation of the pattern elements and sequence rows in the image. If one of the contours of the pattern element is exceeded, the color value or the spectral composition is altered. Said color value or said spectral composition can be measured for comparison of the color numbers with the adjacent element.

In the case of disturbances and in cases of uncertain decision, the comparison of the calculated three-dimensional coordinates with those of the surroundings of an object point 6 may also contribute to avoiding or correcting errors. This corresponds to a trimming of the calculated surface in the three-dimensional model.

Instead of a conventional projector with positive transparency, it is also possible to use a controllable image matrix projector which is controlled by a video signal and, with an active matrix of light modulators, generates the pattern image contained in the video signal and projects it onto the object 3 by means of an optical arrangement. The light modulators of the image-generating controlled matrix may be LCD elements for transmitted light attenuation or those with reflective layers. It is also possible to use matrices of micromirrors, laser diodes or other light-generating elements. Finally, an areal color pattern 9 can also be generated and projected by means of the line-by-line movement, scanning, as in the case of television, of a single light source, over a space sector. The various technologies for light modulation can be subdivided into those with light generation, with light attenuation during the passage of light, with light reflection or by two-dimensional scanning.

One advantage of the pattern generation with a controllable matrix projector in comparison with the projection of a fixed positive transparency is that, after the evaluation of a reference image recorded first, the subsequently generated pattern is controlled in terms of its local brightness, its contrast or in terms of the number or selection of the colors and can thus be optimally adapted to the properties of the object with regard, for example, to its brightness or color.

FIG. 2 shows a diagram for a three-dimensional coordinate measurement by triangulation with color projection. For the triangulation, the projector 1, the camera 2 and the object 3 are arranged at the corners of a triangle. The path between projector 1 and camera 2 is referred to as base 14 and is known. The projector 1 images a color pattern 9 on the surface of an object 3. A multiplicity of surface points 6 of the object 3 are to be measured, the three-dimensional coordinates of the object point being determined in each case. The method of triangulation is preferably used for the calculation. Firstly the camera angle κ and secondly the projection angle Φ are important in these calculations. Through the angle Φ, each object point 6 can be assigned a position relative to projector 1 and camera 2. The associated angle κ of the viewing beam of the camera is known through the pixel coordinates and the data from the optical camera calibration. The illumination indicated in FIG. 2 by a color pattern 9 in the form of a successive series of different colors represents a coding which can be used to unambiguously determine the position of a pattern element in this sequence. The letters R-G-B stand for red-green-blue.

Figure 3:
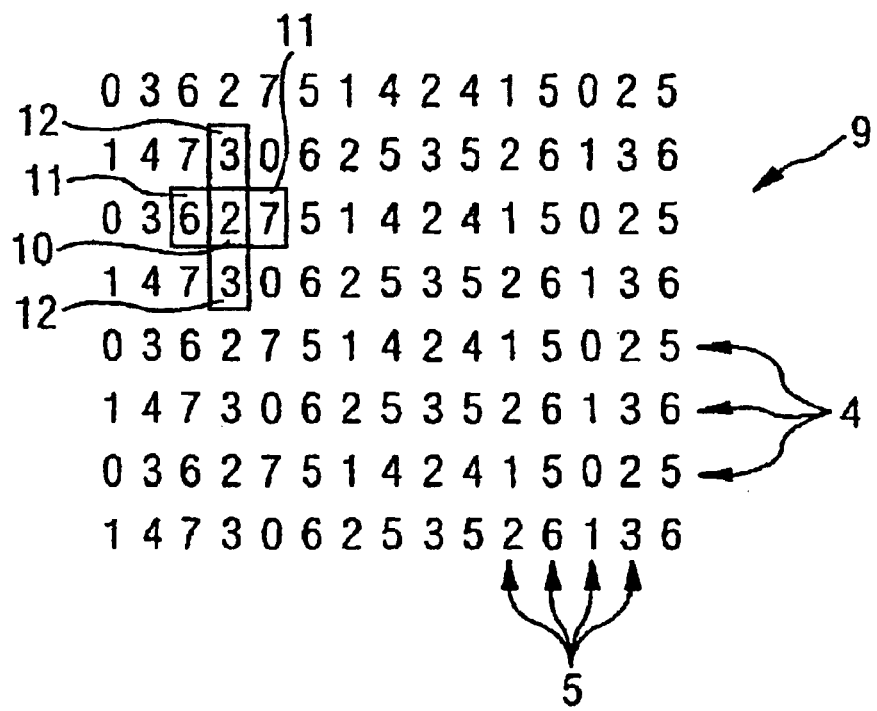
FIG. 3 shows a detail from a color pattern

FIG. 3 shows a detail corresponding to the detail III—III in FIG. 1. The elements of the color pattern 9 that are to be brought into reference in accordance with the coding are identified in this case. A pattern element 10 that is presently being considered is adjoined by pattern elements 11, which are horizontally adjacent in this rectangular system, and by pattern elements 12, which are vertically adjacent, that is to say occur in adjacent rows. The rows 4 are approximately perpendicular to columns 5.

Figure 4:
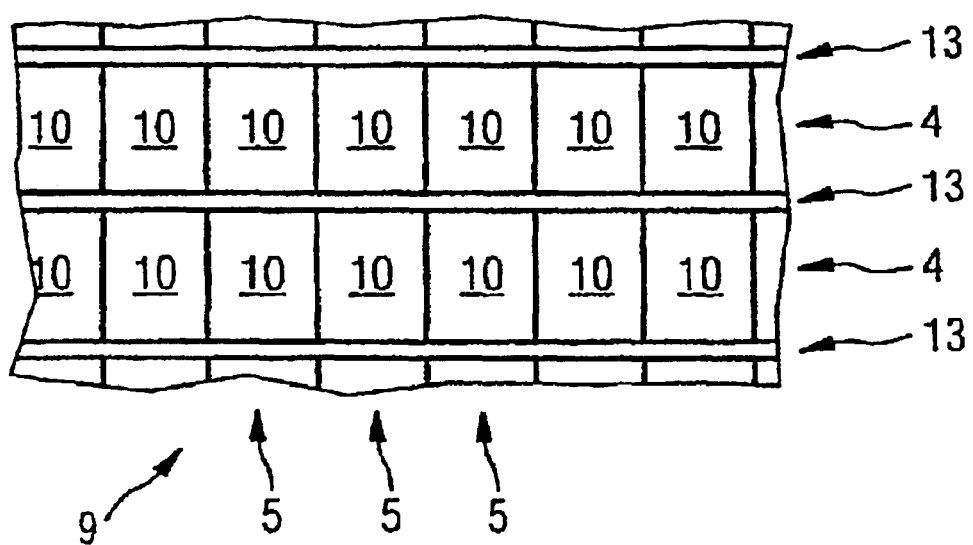
FIG. 4 shows a detail from a color pattern, separating strips being present between the rows.

FIG. 4 shows a detail from a color pattern 9 with rows 4 and columns 5, pattern elements 10 being marked. The separating strips 13 that are present between the rows 4 and have a color that differs from the color elements indicate the variant of the invention which also permits color identity of adjacent pattern elements in columns 5.

According to the invention, a two-dimensional color pattern, comprising colored pattern elements 10, is used which contains information, i.e. is coded, not only in the color of a pattern element but also in the relationships with the immediate neighbors of said pattern element. Through the determination of the colors together with the adjacency relationships, it is possible to infer the position in the color pattern. It is thus possible to produce an extremely compact and therefore faultproof pattern for the coding of the projection angle Φ for the three-dimensional measurement by the active triangulation. Consequently, it is possible to apply a coding for the positional identification of object points 6 by means of a single pattern which is projected by a projector 1, usually a transparency projector, onto an object to be measured. This obviates the need to carry out multiple exposures with changing patterns in accordance with the coded light approach. According to the invention, a single illumination with this single pattern is sufficient. If, in order to increase the identification reliability, a reference image is to be recorded with uniformly white or spectrally uniformly distributed object illumination, a maximum of two illuminations would be necessary. The recording of a reference image, a normal color image, which reproduces the inherent colors of the object, is useful for determining the colors in the image in particular in the case of colored objects. In the case of objects with weak color variation, for example in the case of green or white objects, an image recording of the object with projected pattern suffices for the determination of the three-dimensional coordinates.

Applications for the invention are, in particular, detection of the facial form of a person, for a recognition or, alternatively, the recognition of gestures. A summary of the advantages reveals the following:

it is necessary merely to project a single pattern, the coding is extremely fault-free through the restriction to the very closest adjacency relationships through comparison in the horizontal and vertical directions, the horizontal and vertical coding is done simultaneously, the use of the horizontally and vertically adjacent pattern elements of a pattern, element that is presently to be detected furthermore results in a minimization of the location region during coding, since diagonally adjacent elements are not taken into account, the coding yields the unambiguous determination of a pattern element in the projected color pattern in the row direction and thus the determination of the projection angle Φ, the three-dimensional coordinates of said object point 6 subsequently being able to be calculated by triangulation, the recording of a reference image enables disturbing light compensation, the reference image being recorded without single color pattern with uniform illumination.

Literature References

[1] K. L. Boyer, A. C. Kak, "Color-Encoded Structured Light for Rapid Active Ranging", IEEE PAMI 9 (1), 1987.

[2] H. Hügli, G. Maître, "Generation and Use of Color Pseudo Random Sequences for Coding Structured Light in Active Ranging", SPIE Vol. 1010 Industrial Inspection, 1988.

[3] X. Jiang, H. Bunke, "Dreidimensionales Computersehen" [Three-dimensional computer vision], Springer Verlag 1997.

What is claimed is:

1. A method for determining three-dimensional surface coordinates comprising the steps of:

illuminating an object (3) with a color pattern (9) of known structure by a projector (1) and recording an object image by a camera (2), the color pattern comprising pattern elements (10) that each have a polygonal contour and one color selected from a group of different colors, the color pattern (9) having at least two adjacent rows (4) with a multiplicity of the pattern elements (10), each respective pattern element (10) being distinguishable in color both from an adjacent pattern element (11) within the row and from an adjacent pattern element (10) situated in an adjacent row, and determining the position of each of the pattern elements (10) of the recorded image by determining a respective projection angle (Φ), for each of the pattern elements (10) and by referring to a known relative position between the camera (2) and the projector (1), to determine the three-dimensional surface coordinates of object points considered.

2. The method as claimed in claim 1, wherein, for each pattern element (10) considered, the combination with one of the considered pattern element's immediate neighbors in the row together with one of the considered pattern element's immediate neighbors from an adjacent row for the color pattern in the row direction is unique.

3. The method as claimed in claim 1, wherein the group of colors includes ultraviolet or infrared light.

4. The method as claimed in claim 1, wherein the pattern elements (1) of a row (4) are combined in groups to form a sequence.

5. The method as claimed in claim 4, wherein a plurality of identical sequences (7; 8) are strung together in a respective row.

6. The method as claimed in claim 4, wherein a plurality of different sequences (71; 81) are strung together in a respective row.

7. The method as claimed in claim 1, wherein the pattern elements are rectangular and the color pattern (9) has rows (4) and columns (5) oriented perpendicularly to one another.

8. The method as claimed in claim 1, wherein the vertically adjacent rows (4) are strung together a number of times vertically in the color pattern (9).

9. The method as claimed in claim 1, wherein the group of different colors includes between three and sixty-four different colors.

10. The method as claimed in claim 1, wherein separating strips (13) having a color that differs from all the colors in the group of different colors are present in each case between two rows and the color identity of two adjacent pattern elements (10, 12) is permitted in a non-horizontal direction.

11. The method as claimed in claim 1, wherein a reference image with spectrally uniformly distributed illumination is recorded in order to minimize disturbance effects as a result of existing light conditions.

12. The method as claimed in claim 11, wherein the projector is a raster image projector whose pixels can be controlled in terms of color and brightness, so that, after the evaluation of a reference image recorded first, the subsequently generated color pattern can be controlled in terms of one of its local brightness, its contrast, its of the colors and its selection of the colors, in order to optimally adapt the pattern to the color and brightness of the object.

13. The method as claimed in claim 1, wherein each of the pattern elements includes only one respective color and the one respective color is distinguishable from respective colors of each adjacent one of the pattern elements.

14. A method for determining three-dimensional surface coordinates comprising the steps of:

illuminating an object with a color pattern by a projector and recording an object image by a camera, the color pattern comprising plural distinct pattern elements that each includes only one respective color selected from a group of different colors, the color pattern having at least two adjacent rows with a multiplicity of the pattern elements, where the one respective color is distinguishable from the respective colors of an adjacent pattern element within the row and of an adjacent pattern element situated in an adjacent row; and determining the position of each of the pattern elements of the recorded image by determining a respective projection angle for each of the pattern elements and by referring to a relative position between the camera and the projector, to determine the three-dimensional surface coordinates of object points considered.

* * * * *